(12) United States Patent
Jun et al.

(10) Patent No.: US 6,766,210 B2
(45) Date of Patent: Jul. 20, 2004

(54) PROCESS ERROR PREVENTION METHOD IN SEMICONDUCTOR FABRICATING EQUIPMENT

(75) Inventors: Tae-Ha Jun, Suwon (KR); Hee-Sun Chae, Suwon (KR); Kyung-Bo Sim, Seoul (KR); Jong-Hwan Weon, Kyounggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/222,852

(22) Filed: Aug. 19, 2002

(65) Prior Publication Data
US 2003/0069660 A1 Apr. 10, 2003

(30) Foreign Application Priority Data
Oct. 5, 2001 (KR) ................................ 10-2001-0061398

(51) Int. Cl.[7] .............................................. G06F 19/00
(52) U.S. Cl. ........................ 700/110; 700/121; 438/14
(58) Field of Search .............................. 700/31, 51, 78, 700/91, 108, 110, 121, 177; 438/5, 14

(56) References Cited

U.S. PATENT DOCUMENTS

| | | | |
|---|---|---|---|
| 5,774,355 A | | 6/1998 | Mizuno et al. ............. 364/140 |
| 5,923,553 A | * | 7/1999 | Yi ........................... 364/468.17 |
| 6,086,676 A | * | 7/2000 | Kao et al. ................... 118/695 |
| 6,090,632 A | * | 7/2000 | Jeon et al. ...................... 438/14 |
| 6,198,982 B1 | * | 3/2001 | Park et al. .................... 700/121 |
| 6,298,470 B1 | * | 10/2001 | Breiner et al. .................. 716/4 |
| 6,304,791 B1 | * | 10/2001 | Kim ............................ 700/121 |
| 6,314,385 B1 | * | 11/2001 | Kim et al. .................... 702/184 |
| 6,445,967 B1 | * | 9/2002 | Travagline et al. ........... 700/99 |
| 6,618,692 B2 | * | 9/2003 | Takahashi et al. ........... 702/188 |
| 2002/0035447 A1 | * | 3/2002 | Takashi et al. .............. 702/188 |
| 2002/0077718 A1 | * | 6/2002 | Harburda et al. ............ 700/106 |
| 2002/0116083 A1 | * | 8/2002 | Schulze ....................... 700/108 |

FOREIGN PATENT DOCUMENTS

| | | | | |
|---|---|---|---|---|
| JP | 11-145024 | * | 5/1999 | ........... H01L/21/02 |
| JP | 11-238659 | * | 8/1999 | ........... H01L/21/02 |

* cited by examiner

*Primary Examiner*—Leo Picard
*Assistant Examiner*—Sean Shechtman
(74) *Attorney, Agent, or Firm*—Lee & Sterba, P.C.

(57) ABSTRACT

A method for preventing process errors in a semiconductor fabricating process allows only a few authorized engineers to release interlocks of semiconductor fabricating equipment when a count of interlock occurrences exceeds a predetermined number within a predetermined period of time. By allowing a semiconductor fabricating equipment operator only limited ability to reset equipment interlocks, repeated interlock conditions caused by test specification failures may be over-ridden only a predetermined number of times before the semiconductor fabricating equipment is disabled completely. The disabled semiconductor fabricating equipment may only be re-enabled using an authorization code, which is only made available to selected personnel, thereby ensuring that necessary repairs and corrections have been implemented on the semiconductor fabricating equipment.

12 Claims, 4 Drawing Sheets

PROCESS ERROR PREVENTION METHOD IN SEMICONDUCTOR FABRICATING EQUIPMENT

BACKGROUND OF THE INVENTION

1. Field of the Invention

The present invention relates to a process error prevention method in semiconductor fabricating equipment. More particularly, the present invention relates to a method for preventing process errors by controllably releasing interlocks when process parameters are input beyond set values and interlocks are generated at a rate exceeding a predetermined frequency, i.e., when a count of interlock occurrences exceeds a predetermined number within a predetermined period of time.

2. Description of the Related Art

In order to fabricate a semiconductor device, wafers are repeatedly subjected to a set of processes, such as cleaning, diffusion, photoresist coating, exposure, developing, etching, ion implantation, and the like. Specialized equipment is used for performing each of these processes. In order to optimize a fabrication line, wafers are typically processed in batches, or lots, of about 20 to 25 wafers.

Quality control parameters are typically created during each of the processes and are communicated to processing equipment and control computers where the data is stored for subsequent analysis. After a typical process is completed, a measuring process is performed to determine whether defective wafers have been created in the process. If defective wafers are detected, an interlock operation is activated to halt further processing activity, and an alarm signal is generated to alert a process operator.

Upon confirming that the equipment is interlocked, the operator informs a skilled engineer regarding the interlocked state of the equipment. Upon learning of the interlock condition, the engineer takes a series of steps to resolve the problem that prompted the interlock. When informed that the problems have been resolved, the operator releases the interlock in the equipment, thereby enabling the equipment to resume the wafer processing.

Due to technological trends toward higher integration density, tighter design rules, and lower device operating voltages, however, data collection of parameter (DCOP), static process control and interlock referencing are subjected to quality control test tolerances that are tighter and more complex. In addition, double interlock capability may be included in the processing equipment.

Thus, interlock stoppages of equipment in a single process line may be generated hundreds of times per day. Further, frequent interlock occurrences may be created that are prompted by a recurring, uncorrected or insufficiently corrected error. Such interlock stoppages degrade productivity and may also cause massive defects in quality if other engineering personnel are not informed of an interlock generation activity and/or do not know that the interlocks are caused by a recurring problem. Such "recurring error" interlocks may result from a problem that has been only temporarily repaired or "masked" by an erroneous repair solution whereupon the problem may later recur.

SUMMARY OF THE INVENTION

In an effort to solve the problems described above, it is a feature of an embodiment of the present invention to provide a process error prevention method for preventing multiple interlocks that may be prompted by a recurring error, e.g., a same cause, in a semiconductor fabricating process. An interlock that is created due to a predetermined number of interlock fault signals from a same processing station occurring within a predetermined period of time preferably causes a master interlock to occur, thereby inhibiting operation of the processing station. Interlock-release authority, being limited to only a few authorized skilled engineers, may be exercised only upon proper resolution and logging of the interlock fault condition.

In the description and claims of the present invention, the term "three-strike-out," as in "three-strike-out module" or "three-strike-out process," refers to an act of counting a number of times an event occurs and causing a piece of equipment that may be responsible for the occurrence of that event to be disabled when the number of times reaches a predetermined number, or a piece of equipment for performing the act above. The predetermined number is not necessarily three.

According to an embodiment of the present invention, a process error prevention method preferably includes: generating a plurality of manufacturing process characterization data signals in a plurality of pieces of semiconductor fabricating equipment; transmitting the process characterization data signals to a data collecting server; comparing in the data collecting server the process characterization data signals to a range of optimum process conditioning parameters that are stored in a database in the data collecting server; continuing the manufacturing process if the results of the comparisons satisfy an acceptance criteria; generating an interlock signal and transferring that interlock signal to a "three-strike-out" module if the results of the comparisons do not satisfy the acceptance criteria; disabling a particular one of the plurality of pieces of semiconductor fabricating equipment via the three-strike-out module if associated interlocks are received in the three-strike-out module as many as a predetermined number of times within a predetermined period of time. This ensures that the piece of semiconductor fabricating equipment does not operate until authorized engineers resolve the acceptance criteria problem. Upon notification that the problem has been resolved, preferably only a restricted set of authorized personnel may cause resetting and/or re-enabling of both the particular piece of disabled semiconductor fabricating equipment and a related portion of the three-strike-out module. Preferably, re-enabling a disabled particular one of the plurality of pieces of semiconductor fabricating equipment occurs only upon an inputting of a correct authorization code.

In the process error prevention method of the present invention, the predetermined number is preferably set in the three-strike-out module, and the predetermined number is preferably three.

These and other features of the present invention will be readily apparent to those of ordinary skill in the art upon review of the detailed description that follows.

BRIEF DESCRIPTION OF THE DRAWINGS

The foregoing and other features and advantages of the present invention will be better understood from the following detailed description of preferred embodiments with respect to the accompanying drawings, in which.

DETAILED DESCRIPTION OF THE INVENTION

Figure 1:
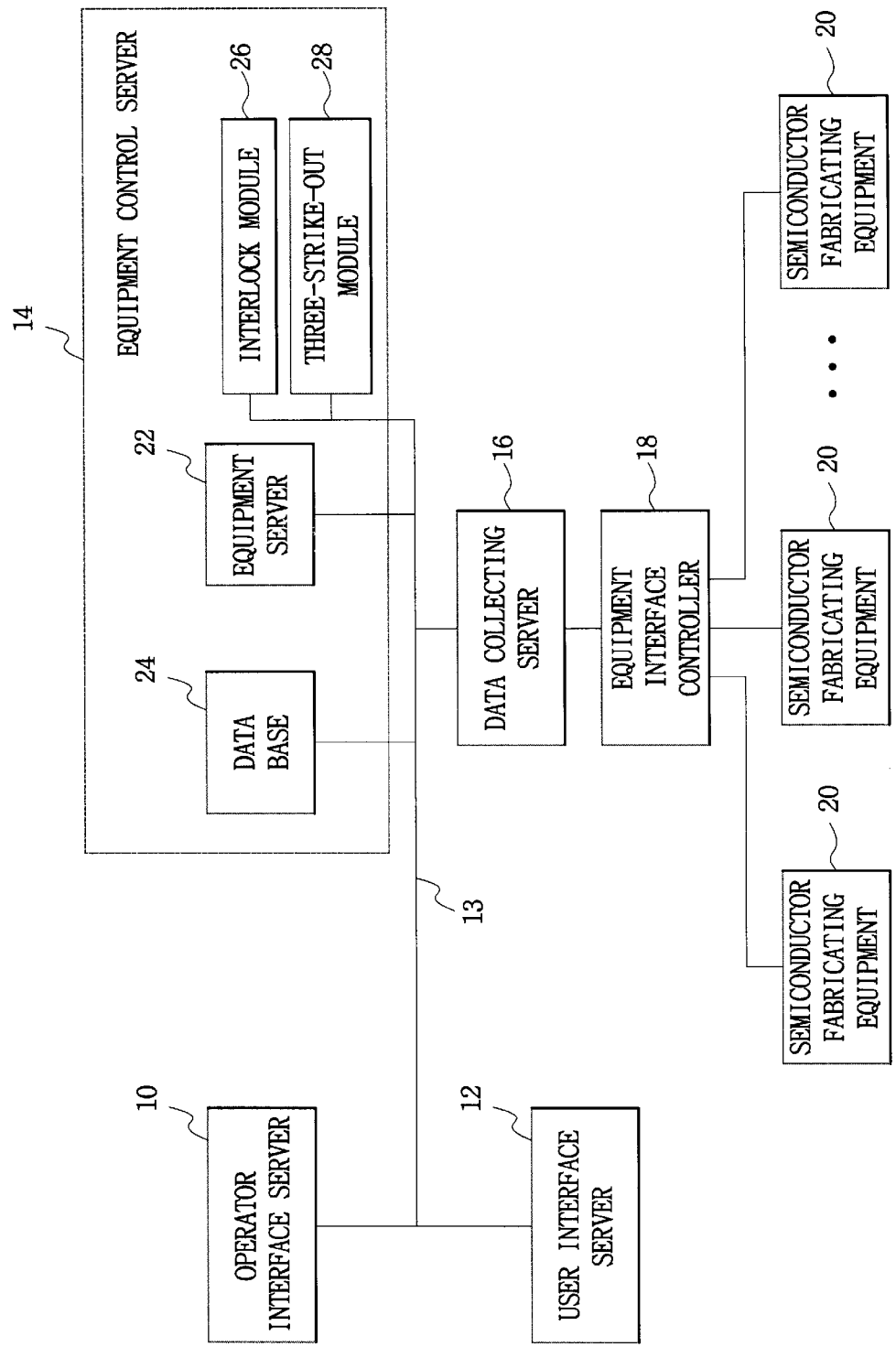
FIG. 1 illustrates a system diagram for controlling a semiconductor fabricating facility according to an embodiment of the present invention.

Korean Patent Application No. 2001-61398, entitled: "Process Error Preventing Method in Semiconductor Fabricating Equipment," filed on Oct. 5, 2001, is incorporated by reference herein in its entirety.

In the following detailed description and drawings, like reference numerals are used to indicate like elements throughout. A detailed description of well-known functions and structures are omitted to clarify key points of the present invention.

FIG. 1 illustrates a system diagram for controlling semiconductor fabricating equipment according to an embodiment of the present invention. A plurality of pieces of semiconductor fabricating equipment 20 are loaded with wafers in order to perform semiconductor fabricating processes. An operator interface server 10 is input with process conditions for performing each one of a plurality of semiconductor fabricating processes in the corresponding piece of semiconductor fabricating equipment 20. The operator interface server 10 also controls the release of any interlocks that are generated in the semiconductor fabricating equipment 20 to thereby enable continued processing. A user interface server 12 monitors the status of each piece of semiconductor fabricating equipment 20 in a remote job entry and records the generation of interlocks in each piece of semiconductor fabricating equipment 20.

A data collecting server 16 is connected to a data bus 13 to receive commands for beginning each of the plurality of semiconductor fabricating processes from the operator interface server 10. The data collecting server 16 acts as an interface controller between the upstream servers and an equipment interface controller 18, which in turn communicates with each piece of semiconductor fabricating equipment 20. The data collecting server 16, transfers the command signals to the appropriate piece of semiconductor fabricating equipment 20 via the equipment interface controller 18. The data collecting server 16 also collects data generated during the semiconductor fabricating processes in real time to determine whether an interlock has been generated. If an interlock has been generated, the data collecting server 16 informs an equipment controlling server 14 of the interlock generation.

The equipment control server 14 provides process condition data signals to the operator interface server 10, receives data and interlock signals from the data collecting server 16, determines whether an interlock has been generated more than a predetermined number of times, and performs a three-strike-out process if interlocks have been generated more than the predetermined number of times. To perform the above process, the equipment control server 14 preferably further includes a database 24 for receiving and storing static process control (SPC) data signals, an interlock module 26, a three-strike-out module 28, and an equipment server 22.

The interlock module 26 preferably includes a program for receiving and processing interlock data signals from the data collecting server 16 in order to monitor the interlock status of each piece of semiconductor fabricating equipment 20. When necessary, the interlock module 26 shuts down the interlocked equipment and simultaneously outputs a corresponding signal to the equipment server 22 indicating the generation of an interlock. The three-strike-out module 28 preferably includes a program for receiving, counting, and processing interlock data signals from the data collecting server 16 in order to control a three-strike-out process when interlocks are generated more than the predetermined number of times. The equipment server 22 receives data signals indicating the generation of interlocks from the data collecting server 16 and generates control signals to interlock the corresponding piece of semiconductor fabricating equipment 20. The equipment server 22 also receives a three-strike-out data signal for storing the three-strike-out state of the corresponding piece of semiconductor fabricating equipment 20 in the database 24. Additionally, a secured quality control mechanism is included to ensure that only a few authorized engineers may release the interlocks.

Figure 2:
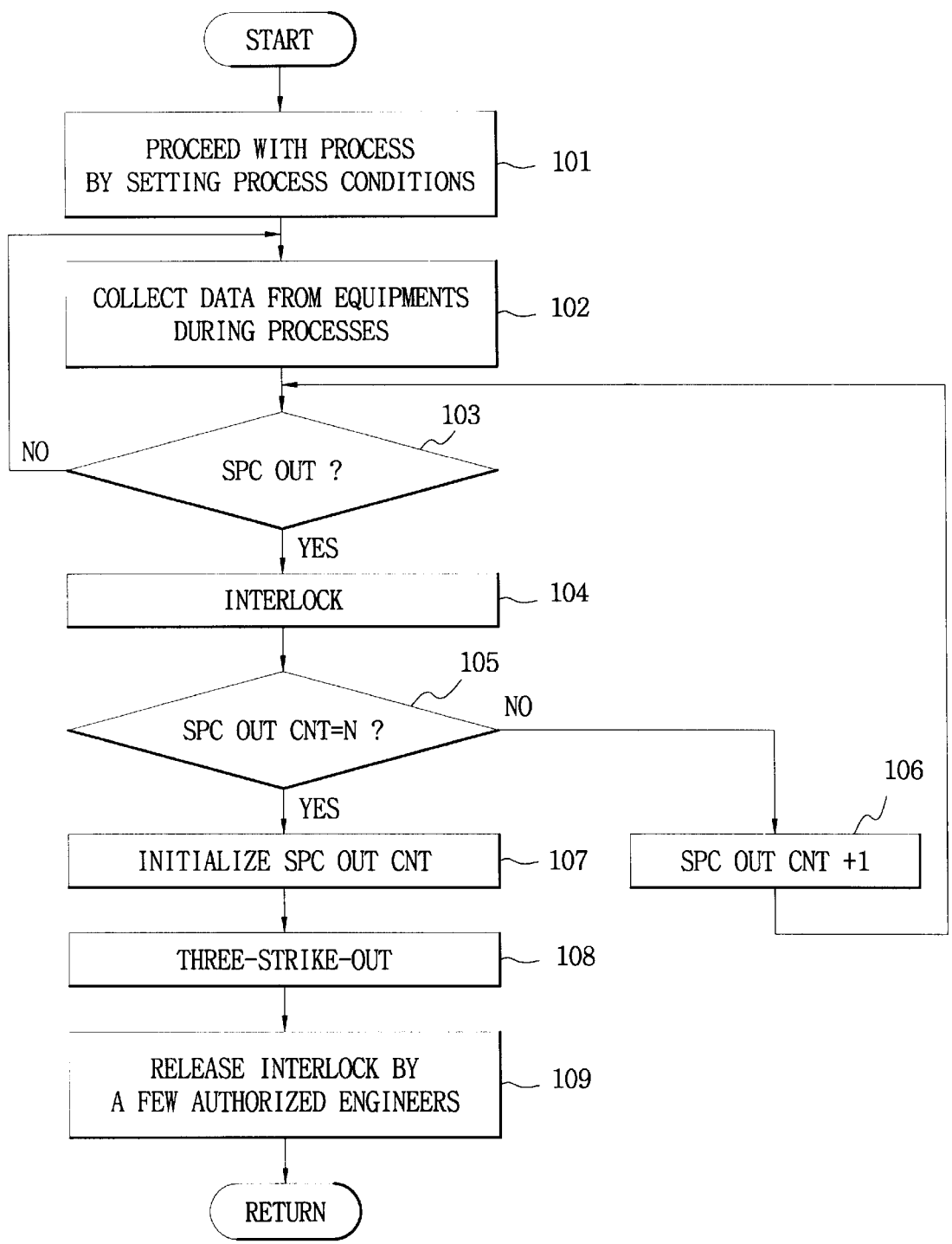
FIG. 2 is a flow chart for controlling a three-strike-out process in response to the generation of interlocks according to an embodiment of the present invention.

FIG. 2 is a flow chart illustrating the control of a three-strike-out process in response to the generation of an interlock according to an embodiment of the present invention.

Figure 3A:
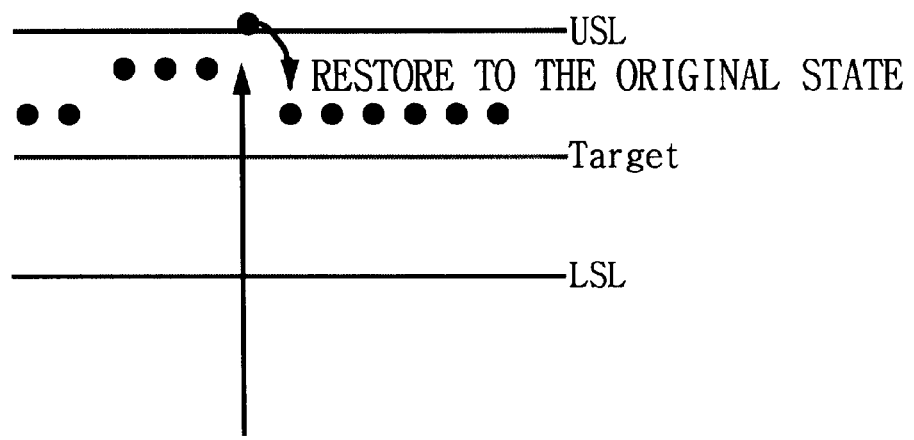
FIG. 3a illustrates an exemplary graph showing a trend beyond the control-limited lines, an upper specification limit (USL) and a lower specification limit (LSL) that are first applied to a static process control (SPC)
Figure 3B:
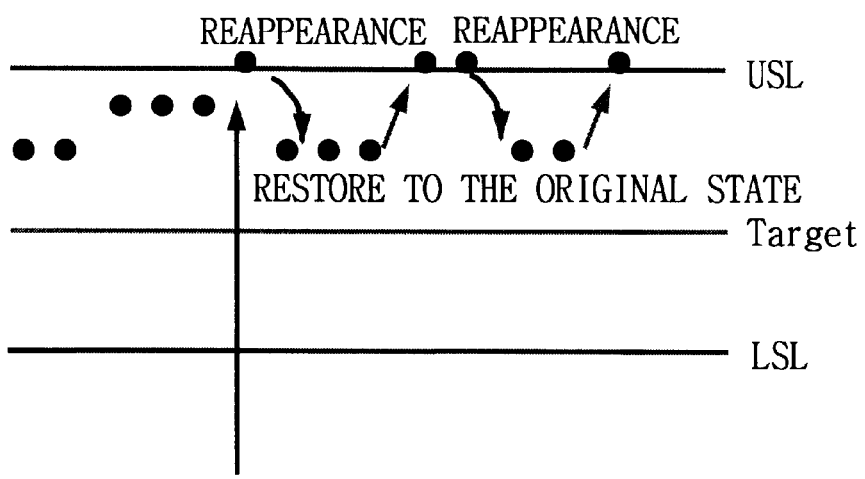
FIG. 3b illustrates an exemplary graph showing a trend beyond the control-limited lines USL and LSL which are secondly used in an SPC.

FIGS. 3a and 3b illustrate exemplary graphs showing trends beyond the control-limited lines USL and LSL in a static process control (SPC).

Referring to FIGS. 1 and 2, in step 101, the operator interface server 10 is input with various parameters and process conditions necessary to initiate the processes in the corresponding pieces of semiconductor fabricating equipment 20. The input parameters are input to the data collecting server 16 via data bus 13. The input parameters are transferred by the data collecting server 16 to the equipment interface controller 18 and then to the appropriate piece of semiconductor fabricating equipment 20.

In step 102, the data collecting server 16 collects process characterization data signals from each of the plurality of pieces of semiconductor fabricating equipment 20 via the equipment interface controller 18.

In step 103, data collecting server 16 compares the received process characterization data signals with a range of optimum process conditions for the static process control (SPC). That is, the data collecting server 16 determines whether the parameters are out of the predetermined limits, an upper specification limit (USL) or a lower specification limit (LSL) as shown in FIG. 3a, thereby determining whether the static process control is out (SPC OUT). If the parameters are within the specification limits, (i.e., not an SPC OUT condition), the data collecting server 16 returns to and repeats step 102 and continues to collect process characterization data. If the parameters are not within the specification limits, (i.e., an SPC OUT condition), the data collecting server 16 transfers the interlock data signal to the interlock module 26 of the equipment control server 14.

In step 104, the interlock module 26 outputs a corresponding interlock data signal to the equipment server 22, thus interlocking and disabling the corresponding piece of semiconductor fabricating equipment 20. At this time, the equipment server 22 stores in the database 24 the SPC OUT data signal of the semiconductor fabricating equipment 20 where the interlock was generated. Thereafter, an authorized engineer repairs the interlocked semiconductor fabricating equipment 20, and an operator manipulates the operator interface server 10 to reset the interlock and resume normal operation of the semiconductor fabricating equipment 20, provided the problems have been sufficiently resolved. In addition, the interlock module 26 generates an interlock data signal and transfers that data signal to the three-strike-out module 28 for recording the interlock occurrence.

In step 105, at the three-strike-out module 28, an SPC OUT counter (not shown) counts the number of the SPC OUT (SPC OUT CNT) to determine whether the number of the SPC OUT has reached a predetermined value N within a specified time period. If the SPC OUT CNT is not the predetermined value N, for instance if SPC OUT CNT ≠3, in step 106, the three-strike-out module 28 increases the SPC OUT CNT by 1 and loops back to retest SPC OUT in step 103.

When a reappearance of the SPC OUT is detected, the three-strike-out module 28 determines which control limit was exceeded, (i.e., USL or LSL), such data being secondarily applied to the SPC, as shown in FIG. 3b. Thereafter, step 104 proceeds as previously described. In step 105, the three-strike-out module 28 again detects whether the SPC OUT CNT indicates a predetermined value N within a predetermined time period. Upon an occurrence of the Nth interlock, preferably, for example, N=3 and SPC OUT CNT=3, the process is routed to step 107. In step 107, the three-strike-out module 28 re-initializes the SPC OUT CNT to zero.

In step 108, the three-strike-out module 28 transfers the three-strike-out data signal to the equipment server 22 to allow the equipment server 22 to record the data signal in the database 24, thereby indicating that the corresponding piece of semiconductor fabricating equipment 20 having the three-strike-out state is disabled. If the database 24 records that the semiconductor fabricating equipment 20 is disabled due to a three-strike-out state, the corresponding semiconductor fabricating equipment 20 will not operate even if the operator interface server 10 instructs the semiconductor fabricating equipment 20 to resume process operations.

In step 109, if the operator interface server 10 instructs the equipment to release the interlock, the screen of the operator interface server 10 displays a message that a secret number, or authorization code, should be input. If, using operator interface server 10, the correct authorization code is input and an execution command is input, the corresponding semiconductor fabricating equipment 20 is released from the interlocked state.

As described above, since only a limited number of authorized skilled engineers may accurately analyze the cause of an interlock in semiconductor fabricating equipment 20 and take the proper corrective steps when the semiconductor fabricating equipment 20 is at the three-strike-out state due to the generation of interlocks, the corresponding fabrication processes are not performed while semiconductor fabricating equipment 20 is interlocked and disabled, thereby preventing any accidents or further defects.

Figure 4:
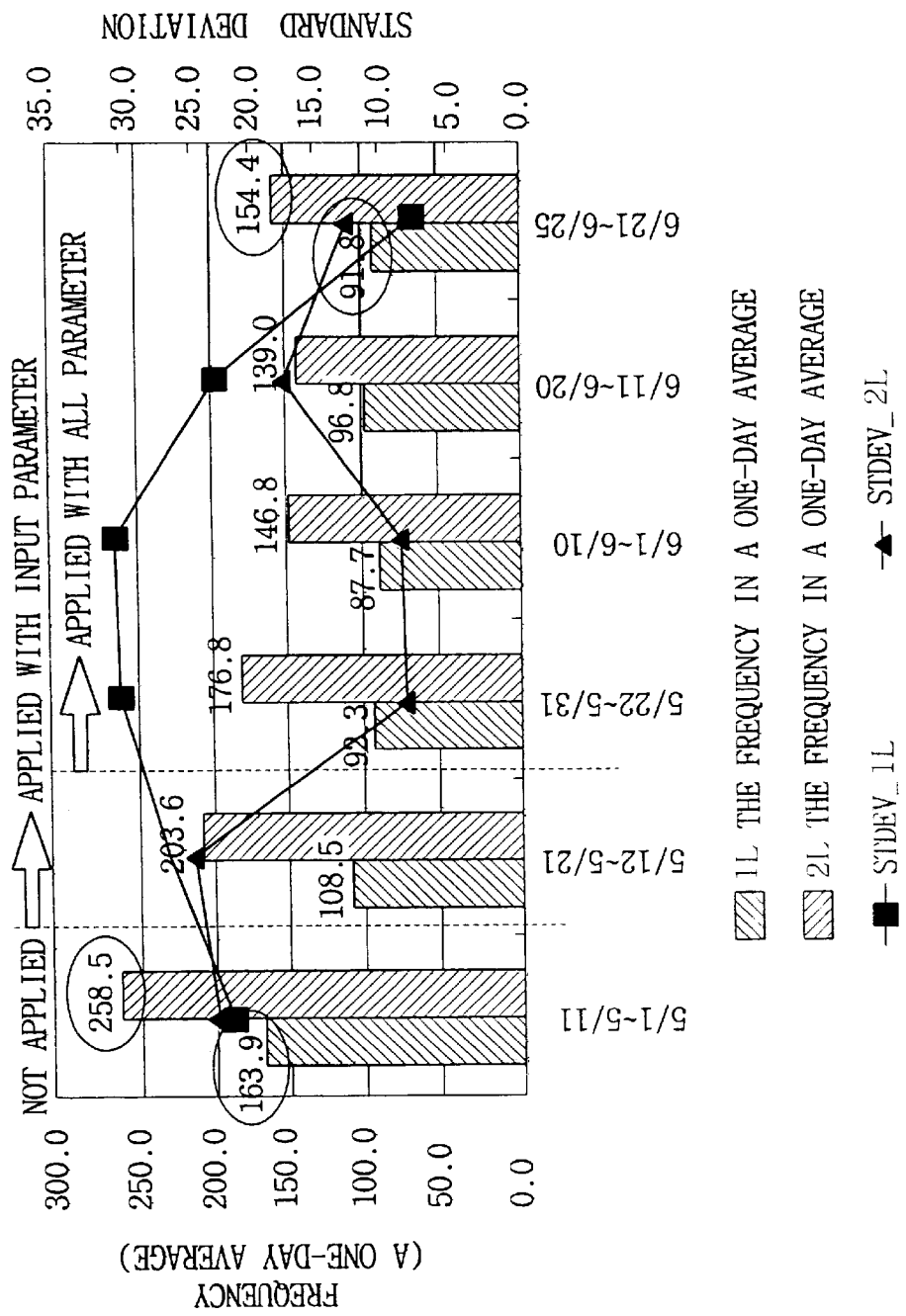
FIG. 4 illustrates graphs showing the frequency of interlocks in a one-day average in a specific production line where an embodiment of the present invention is applied.

FIG. 4 illustrates graphs showing exemplary measurement results in exemplary first and second production lines before and after the three-strike-out module is applied. Referring to FIG. 4, the frequency of interlocking is 163.9 in a one-day average in the first production line and 258.5 in a one-day average in the second production line, respectively, at the state that the three-strike-out module is not applied during a representative period from May 1 to 11, 2001. Upon implementation of the three-strike-out module of the present invention to only the input parameters, the frequency of interlocking becomes 108.5 in a one-day average in the first production line and 203.6 in a one-day average in the second production line, respectively, as shown during the exemplary period from May 12 to 21, 2001.

The above results indicate that the frequency of interlocking significantly decreases even in a case that the three-strike-out module is applied to only the input parameters. As a result of applying the three-strike-out module to all parameters, as shown during an exemplary period from May 22 to Jun. 25, 2001, the frequency of interlocking is further decreased by about 72 in a one-day average in the first production line when compared with that of May 1 to 11, which corresponds to a 44% decrease in the frequency of interlocking, and by about 104 in a one-day average in the second line when compared with that of May 1 to 11, which corresponds to a 40% decrease in the frequency of interlocking.

Advantageously, according to preferred embodiments of the present invention, if interlocks are generated more than a predetermined number of times within a predetermined period of time during semiconductor fabricating processes, the semiconductor fabricating equipment is completely disabled and can only be re-enabled by a select few authorized skilled engineers who have access to a secret authorization code. In this way, the process error prevention method prevents interlocks from being generated multiple times by a recurring error and ensures that necessary repairs and corrections have been implemented on the semiconductor fabricating equipment before it is re-enabled.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A process error prevention method comprising:

generating a plurality of manufacturing process characterization data signals in a plurality of pieces of semiconductor fabricating equipment during a manufacturing process;

repeatedly transmitting the process characterization data signals to a data collecting server during the manufacturing process;

comparing in the data collecting server the process characterization data signals to a range of optimum process conditioning parameters that are stored in a database in the data collecting server;

continuing the manufacturing process if the results of the comparisons satisfy an acceptance criteria;

generating an interlock signal and transferring the interlock signal to an interlock module if the results of the comparisons do not satisfy the acceptance criteria;

disabling a particular one of the plurality of pieces of semiconductor fabricating equipment when the interlock module receives an interlock signal generated at that particular piece of semiconductor fabricating equipment and transferring the interlock signal to a three-strike-out module to be recorded; and disabling a particular one of the plurality of pieces of semiconductor fabricating equipment such that re-enablement thereof is possible only upon an inputting of a correct authorization code into an operator interface server when the three-strike-out module receives an interlock signal generated at that particular piece of semiconductor fabricating equipment a predetermined number of times within a predetermined period of time.

2. The method as claimed in claim 1, wherein the predetermined number is set in the three-strike-out module.

3. The method as claimed in claim 1, wherein the predetermined number is three.

4. The method as claimed in claim 1, wherein a screen of the operator interface server displays a message that the authorization code should be input in order to re-enable the disabled particular one of the plurality of pieces of semiconductor fabricating equipment.

5. The method as claimed in claim 1, wherein the manufacturing process comprises:

loading the plurality of pieces of semiconductor fabricating equipment with wafers;

inputting process conditions for performing each one of a plurality of semiconductor fabricating processes in the corresponding piece of semiconductor fabricating equipment into the operator interface server;

transferring the process conditions to the data collecting server via a data bus;

transferring the process conditions from the data collecting server to an equipment interface controller and then to the corresponding piece of semiconductor fabricating equipment.

6. The method as claimed in claim 5, wherein the operator interface server further controls the release of any interlocks that are generated in the semiconductor fabricating equipment to thereby enable continued processing.

7. The method as claimed in claim 1, wherein the data collecting server collects process characterization signals from each of the plurality of pieces of semiconductor fabricating equipment via an equipment interface controller.

8. The method as claimed in claim 1, wherein a user interface server monitors the status of each piece of semiconductor fabricating equipment and records the generation of interlocks in each piece of semiconductor fabricating equipment.

9. The method as claimed in claim 1, wherein an equipment control server receives data and interlock signals from the data collecting server, provides process condition data signals to the operator interface server, determines whether an interlock has been generated more than a predetermined number of times, and performs a three-strike-out process if interlocks have been generated more than the predetermined number of times.

10. The method as claimed in claim 1, wherein the three-strike-out module includes a program for receiving, counting, and processing interlock data signals from the data collecting server and controls a three-strike-out process when interlocks are generated more than the predetermined number of times.

11. The method as claimed in claim 1, wherein when comparing the process characterization data signals to the range of optimum process conditioning parameters the data collecting server determines whether the process characterization data signals are out of an upper specification limit (USL) or a lower specification limit (LSL).

12. The method as claimed in claim 1, wherein the three-strike-out module counts the number of interlocks, and upon receiving an interlock the predetermined number of times, the three-strike-out module re-initializes the count to zero and transfers the three-strike-out data signal to an equipment server which records the data signal.

* * * * *